C. ELLIS.
PROCESS OF GENERATING HYDROGEN.
APPLICATION FILED JUNE 16, 1913.
1,092,903.
Patented Apr. 14, 1914.
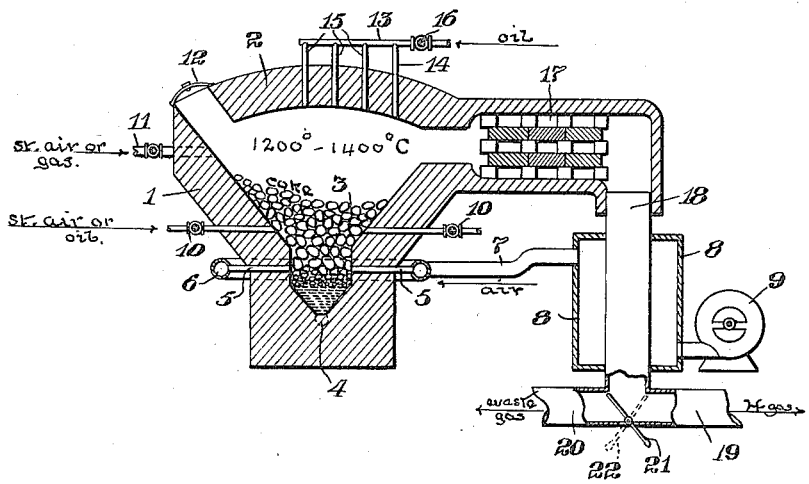

UNITED STATES PATENT OFFICE.

CARLETON ELLIS, OF MONTCLAIR, NEW JERSEY.

PROCESS OF GENERATING HYDROGEN.

1,092,903. Specification of Letters Patent. Patented Apr. 14, 1914.

Application filed June 16, 1913. Serial No. 773,864.

*To all whom it may concern:*

Be it known that I, CARLETON ELLIS, a citizen of the United States, and a resident of Montclair, in the county of Essex and State of New Jersey, have invented certain new and useful Improvements in Processes of Generating Hydrogen, of which the following is a specification.

This invention relates to a method of generating gas consisting wholly or largely of hydrogen derived from the breaking down of the oils and in particular heavy oils and residuum by the action of high temperatures.

The accompanying drawing shows mainly in vertical section an apparatus suitable for carrying out the present invention.

In the drawing 1 is a generator or receptacle having the arched roof 2 and fire bed 3, the fuel used being preferably coke.

4 is an opening for the withdrawal of clinker or slag and as shown intended for the removal of the clinker in the form of molten slag.

5 is a twyer connected with the bustle pipe 6; this in turn communicates with an air preheater 8 by means of the pipe 7.

9 is a pump or blower furnishing a supply of air to the preheater 8.

The pipe 10 may be used for the introduction of steam or air. The pipe 11 may be used for the introduction of steam or air, or inert gas; or, if desired, hydrogen gas may be admitted in lieu of the foregoing.

12 is a fuel feeding hopper.

13 is the oil supply pipe with which are connected the oil feeding pipes 14 and 15. Preferably as shown the pipe 14 is situated so that the oil discharging therefrom falls on the inclined exposed surface of fire brick, while the other oil outlets spray the material on the coke bed.

17 is a checker work which aids in completing the decomposition, but for some oils this checker work may be dispensed with entirely, especially with oils forming large quantities of soot which would tend to choke the passages of the checker work.

18 is a downcomer passing through the air preheater 8 and terminating in an elbow carrying the valve 21 which may be shifted to the position shown at 22 so that the gas may pass away either by the pipe 19 or the pipe 20. Thus, means are provided for separately collecting the gas produced during the air blow and the hydrogen which is produced by a subsequent operation.

Two or more generators may be utilized to advantage under some circumstances in that the gases in hot products arising from the air blow in one generator may be carried to a second generator where more air is admitted and combustion of the gas allowed to take place to aid in the heating the second generator while the first generator is being brought to final working head.

In carrying out the invention as disclosed illustratively by virtue of the accompanying purely diagrammatic drawing, I may first charge into the generator a quantity of coke mixed with a small per cent. of lime in case a liquid slag is to be produced and the bed of coke is brought to a white heat by blowing preheated air through the twyers 5. A temperature of 1200° to 1400° C. preferably is secured, and as stated it is preferable to collect the slag in the liquid form by the addition of a suitable flux such as lime as this avoids many difficulties in connection with clinkering. The products from such air blow may be, as stated, carried to a second generator and burned there in order to raise same in temperature more or less. No illustration of a second generator is, however, shown as such coupling of generators as herein described needs no specific illustration as regards the subject matter of the present invention. The generator 1 now having been brought to a white heat the air blast is shut off and heavy petroleum oil or other suitable oil is injected by means of the distributing pipes 14 and 15 and when this oil strikes the hot bed of coke decomposition occurs with the formation of some coke and some lamp black, relative amounts depending on the nature of the oil and the temperature of the generator. It is desirable to convert the carbon of the oil largely into coke in order to minimize the difficulties brought about by the production of large quantities of soot. A very high temperature facilitates the coking operation and by the addition of lime with the coke which is charged into the generator slagging may be carried out easily and the high temperatures produced which enable the decomposition of the oil mainly into coke and hydrogen without formation of excessive quantities of soot. The hydrogen formed is discharged by the pipe 19 while the products of the air blow pass away by the pipe 20. When the generator is operated to render the checker-work white hot, the latter decomposes oil which is entrained by the gas and completes the decomposition so that a maximum supply of hydrogen is secured. The soot which may thereby form in the checker work may be burned out during the air blow. The generator and passage-way leading therefrom being now filled with hydrogen gas, it is important to remove same without contamination by other gases. To this end steam is blown into the generator by means of pipe 11 and sweeps across the fuel bed without contacting with the fuel to any material extent so that carbon monoxid is not produced to impurify the gas. If the fire bed is of considerable depth so that much hydrogen is contained in the spaces between the fuel a similar amount of steam may be entered by the pipe 10 to expel the hydrogen from the fuel bed, but preferably no great amount of steam should be introduced at this point, because the steam in passing through the fuel bed forms carbon monoxid which is not always a desirable constituent to have as an impurity in hydrogen gas. The steam pipe 11 above the fuel bed enables the removal of the major proportion of the hydrogen without material contact of the same with the fuel. After the hydrogen has been removed the steam may be shut off and the air current again directed through the fuel bed to heat same to a white heat or other suitable temperature and before the oil is again added, it is usually desirable to blow steam for an instant through the pipe 10 and also through the flushing pipe 11 in order to expel the gases and products of combustion. The amount of steam admitted in this manner preferably should be as slight as possible. If desired the steam may be superheated before passing it into the generator. By operating in this way but little cooling action is brought about so that when the oil is entered after the flushing-out operation has been completed, the oil comes into contact with the white hot fuel bed and walls of the generator and hydrogen is produced as aforesaid.

The oil may be introduced if desired by the pipe 10 so that the oil may be entered into the apparatus both above the fuel and within the fuel bed. In order to prevent choking up of the pipes 14 and 15 and also the pipe 10, if same is used for the admission of oil, it is desirable to blow a little steam through these pipes after the oil has been admitted, in order to clean such pipes and prevent incrustations of carbonaceous material.

The gas may be purified by passing over quicklime or hydrated lime and iron oxid to remove carbon dioxid and sulfur and if desired through a mass of heated calcium carbid to eliminate oxygen or carbon monoxid should these bodies be present in any undesirable amount.

It will now be evident that various modifications of the foregoing method may be carried out with divers forms of apparatus without departing from the scope of the present invention and I therefore do not wish to be limited to the precise terms of the illustrative embodiment as above set forth.

What I claim is:

1. The process of generating hydrogen which comprises heating a bed of fuel to a white heat in a confined space, adding oil thereto to decompose the oil into hydrogen and carbon and sweeping out the hydrogen with steam passed over but not through said bed of fuel.

2. The process of generating hydrogen which comprises heating a bed of fuel to a white heat in a confined space, sweeping the products of combustion away from the surface of the bed of fuel, adding oil to said bed, whereby said oil is decomposed into carbon and hydrogen and sweeping out the hydrogen with steam passed over but not through said bed of fuel.

3. The process of generating hydrogen which comprises charging coke into a closed receptacle, bringing the coke to a white heat by introducing a blast of air thereinto and causing combustion to take place, shutting off the blast of air, flushing out the waste gases surrounding the coke with steam when the coke has reached a white heat, injecting heavy petroleum oil onto the heated fuel, allowing the oil to remain in contact with the heated fuel until such oil has been substantially decomposed into hydrogen and carbon, removing the hydrogen as produced, and flushing out the hydrogen surrounding the coke with steam without substantial contact of the steam with the bed of heated coke.

4. The process of generating hydrogen which comprises heating a mixture of coke with a small amount of fluxing material to a white heat in a confined space, adding oil thereto to decompose the oil into carbon and hydrogen and sweeping out the hydrogen with steam passed over but not through said bed of fuel.

5. The process of generating hydrogen which consists in bringing a bed of fuel to a white heat in a refractory chamber, adding oil to the bed of fuel, simultaneously applying oil to the heated surface of the refractory container and sweeping out the gases surrounding the bed of fuel with steam passed over but not through said bed of fuel.

6. In the process of generating hydrogen by the decomposition of oil, the step which consists in applying oil to a heated bed of coke inclosed in a refractory chamber and simultaneously applying oil to the heated surface of said refractory chamber.

Signed at Montclair in the county of Essex and State of New Jersey this 12th day of June A. D. 1913.

CARLETON ELLIS.

Witnesses:
   B. M. ELLIS,
   F. CARBUTT.